US008443381B2

(12) United States Patent
Nagahara et al.

(10) Patent No.: US 8,443,381 B2
(45) Date of Patent: May 14, 2013

(54) API EVALUATION SYSTEM IN EMBEDDED DEVICE

(75) Inventors: Kosaku Nagahara, Osaka (JP); Tomoki Mizobuchi, Kyoto (JP); Maki Hashimoto, Osaka (JP); Osamu Gotou, Osaka (JP)

(73) Assignee: Panasonic Corporation, Osaka (JP)

( * ) Notice: Subject to any disclaimer, the term of this patent is extended or adjusted under 35 U.S.C. 154(b) by 316 days.

(21) Appl. No.: 12/948,526

(22) Filed: Nov. 17, 2010

(65) Prior Publication Data

US 2011/0067040 A1  Mar. 17, 2011

Related U.S. Application Data (63) Continuation of application No. PCT/JP2009/002239, filed on May 21, 2009.

(30) Foreign Application Priority Data

Jun. 10, 2008 (JP) .................................. 2008-151457

(51) Int. Cl.
*G06F 13/00* (2006.01)

(52) U.S. Cl.
USPC .......................................... 719/328; 719/320

(58) Field of Classification Search .................. 719/320, 719/328
See application file for complete search history.

(56) References Cited

U.S. PATENT DOCUMENTS

| 6,810,494 | B2 * | 10/2004 | Weinberg et al. ............... 714/46 |
| 6,898,784 | B1 * | 5/2005 | Kossatchev et al. .......... 717/126 |
| 7,290,145 | B2 * | 10/2007 | Falkenthros .................. 713/182 |
| 7,409,602 | B2 * | 8/2008 | Spadari ........................... 714/45 |
| 2005/0188262 | A1 | 8/2005 | Rosenman et al. |
| 2007/0294586 | A1 | 12/2007 | Parvathy et al. |
| 2008/0178047 | A1 * | 7/2008 | Bae et al. ....................... 714/38 |
| 2009/0249216 | A1 * | 10/2009 | Charka et al. ................. 715/744 |
| 2012/0185831 | A1 * | 7/2012 | Albert et al. .................. 717/128 |

FOREIGN PATENT DOCUMENTS

| JP | 09-198279 | 7/1997 |
| JP | 2000-215082 | 8/2000 |
| JP | 2002-189617 | 7/2002 |
| JP | 2007-026306 | 2/2007 |
| JP | 2007-219893 | 8/2007 |

* cited by examiner

*Primary Examiner* — Andy Ho
(74) *Attorney, Agent, or Firm* — McDermott Will & Emery LLP (57) ABSTRACT

An API evaluation system which includes: a test procedure description device in which an API execution procedure is described; a virtual API device for issuing a command to call the API and acquiring a return value by supplying the API of a target device to the test procedure description device; a script execution device for performing script interpret; a command transmission device for transmitting the command to the target device; and a log reception device for receiving a result log obtained after the API execution from the target device. A user program installed on the target device is controlled and verified on per-API basis.

9 Claims, 10 Drawing Sheets

| API name | return value | argument 1 | argument 2 | ... |
|---|---|---|---|---|
| APINAME_1 | ret | arg1 | arg2 | ... |
| APINAME_2 | ret | arg1 | arg2 | ... |
| APINAME_3 | ret | arg1 | arg2 | ... |
| ⋮ | ⋮ | ⋮ | ⋮ | ⋮ |
| ⋮ | ⋮ | ⋮ | ⋮ | ⋮ |

FIG. 3

| event name |
|---|
| EVT_APIRET |

| API name | API leading address |
|---|---|
| APINAME_1 | 0x80000000 |
| APINAME_2 | 0x80000100 |
| APINAME_3 | 0x80000200 |
| ⋮ | ⋮ |
| APINAME_n | 0x80001000 |

# API EVALUATION SYSTEM IN EMBEDDED DEVICE

CROSS-REFERENCE TO RELATED APPLICATION

This is a continuation of PCT International Application PCT/JP2009/002239 filed on May 21, 2009, which claims priority to Japanese Patent Application No. 2008-151457 filed on Jun. 10, 2008. The disclosures of these applications including the specifications, the drawings, and the claims are hereby incorporated by reference in their entirety.

FIELD OF THE INVENTION

The present invention relates to an apparatus evaluation technology, more particularly to a technology for evaluating an apparatus in which a microcomputer is embedded.

BACKGROUND OF THE INVENTION

There is an increasing demand for reducing development time as the product life cycles of electrical household appliances are becoming shorter over the recent years. This leads to an increasing demand as well for the reduction of verification steps in the development of embedded software programs. To reduce the verification steps, there are ongoing studies for a verification system which automatically evaluates a user program of a microcomputer (for example, see the Patent Document 1).

Figure 12:
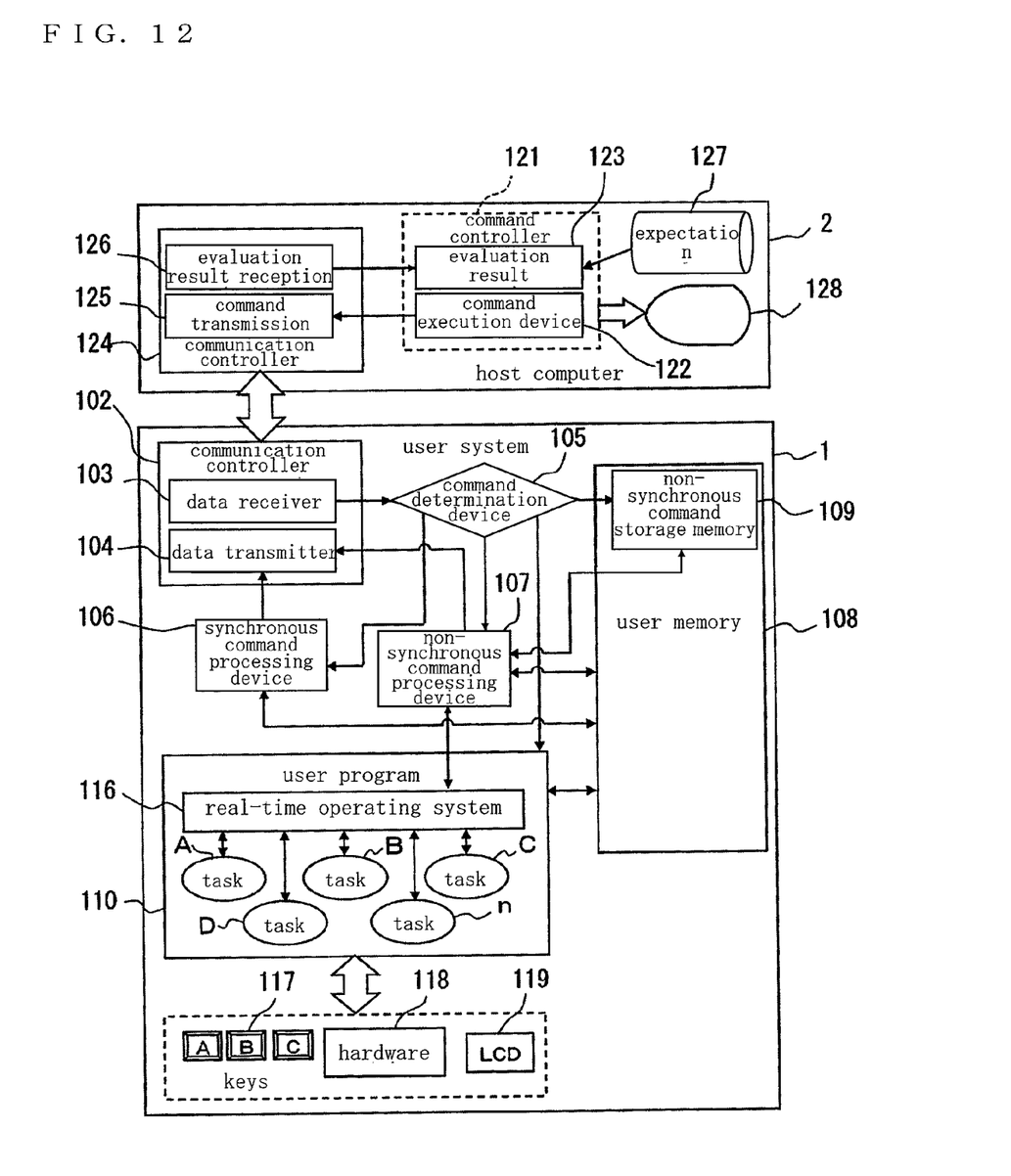
FIG. 12 is a block diagram illustrating an overall structure of a conventional verification system.

Referring to FIG. 12, a conventional verification system is described below. The verification system has a host computer 2 and a user system 1 (hereinafter, may be called target system or a target apparatus) which are respectively provided with structural elements described below. A verification apparatus on the host computer 2 is provided with a command controller 121 and a communication controller 124. The command controller 121 has an evaluation result comparison device 123 and a command execution device 122. The user system 1 is equipped with a communication control device 102 (including a data receiver 103 and a data transmitter 104), a command determination device 105, a user memory 108, a synchronous command processing device 106, and a nonsynchronous command processing device 107.

In the conventional verification system, a command to operate functions of a real time OS on the user system 1 is outputted from the command controller 121 of the verification apparatus on the host computer 2 to control the user program for verification.

PRIOR ART DOCUMENT

Patent Document

Patent Document 1: Unexamined Japanese Patent Applications Laid-Open No. 2002-189617

SUMMARY OF THE INVENTION

Problem to be Solved by the Invention

However, the conventional verification system configured to control the user program using the functions of the real time OS can only control the user program for each task, meaning that various test items cannot be tested on a boundary face of the API. The API is the abbreviation of Application Program Interface, representing an interface consisting of a set of commands/functions that can be used to develop a software program compliant with a platform such as OS or middleware and a set of codes which set forth program-related procedures to utilize the commands/functions.

Means for Solving the Problem

An API verification system according to the present invention comprises:

a target apparatus capable of executing API (Application Program Interface); and an API verification apparatus connected to the target apparatus to allow communication therebetween, wherein the API verification apparatus comprises:

a test procedure description device in which a test procedure of the API is described;

a virtual API device for supplying the API to be executed by the target apparatus to the test procedure description device, and retrieving the supplied test procedure from the test procedure description device to issue a command to call the API pursuant to the retrieved test procedure;

a script execution device for performing script interpret of the command;

a command transmission device for transmitting the command for which the script interpret is done by the script execution device to the target apparatus; and a log reception device for receiving an execution result log of the API from target apparatus which executes the API based on the command, wherein the virtual API device acquires a return value obtained by executing the API from the execution result log received by the log reception device, and the virtual API device has a type of interface similar to the API executed on the target apparatus, the virtual API device comprising:

an API execution unit for outputting a trigger which makes the API be executed on the target apparatus;

a parameter storage unit for storing therein a parameter to be supplied to the API;

an API execution completion standby setting unit for detecting a timing of completion of the API execution by the target apparatus;

an event information management unit for managing an execution-completed event in the API executed on the target apparatus; and a log filter for extracting an information indicating the return value, an information indicating completion of the API execution, and a log relating to an information of the event from the execution result log, and the target apparatus comprises:

a command reception device for receiving the command transmitted by the API verification apparatus;

a command-API correspondence management device for storing therein the command and the API with a correspondence relationship therebetween;

a command execution device for identifying the API relevant to the command received by the command reception device using the command-API correspondence management unit device and executing the identified API;

a user program mounted with a function provided by the API;

a log output device for creating the execution result log including the return value obtained when the command execution device executes the API and a return argument value;

a log description rule management device for defining a method for outputting the execution result log; and a log transmission device for transmitting the execution result log to the API verification apparatus based on the output method defined by the log description rule management device.

According to the API verification system thus technically characterized, the user program on the target apparatus can be controlled on per-API basis, and the test result can be determined from the log thus outputted on the target apparatus.

According to a preferable mode of the present invention, the API verification system further comprises an event reception device for receiving an asynchronous event which occurs by a discretionary timing after the API execution, wherein the log description rule management device defines a method for outputting a log relating to the asynchronous event, the event reception device notifies the log output device of the reception of the asynchronous event, the log output device creates an execution result log including a log description rule relating to the asynchronous event read from the log description rule management device to verify the asynchronous event, the virtual API device further comprises an asynchronous event standby setting unit for detecting a timing of the occurrence of the asynchronous event in the target apparatus, the event information management unit further manages an information of the asynchronous event, and the log filter extracts a log relating to the asynchronous event from the execution result log based on the information of the asynchronous event managed by the event information management unit.

The API verification system thus technically characterized can further flexibly handle the asynchronous event to control the user program.

According to another preferable mode of the present invention, the test procedure description device of the API verification system includes:

a first test procedure description device in which a first test procedure is described; and a second test procedure description device in which a second test procedure is described, the virtual API device further comprises a virtual API control unit for imparting identifiers respectively to the first test procedure described in and read from the first test procedure description device and the second test procedure described in and read from the second test procedure description device, the identifiers separately identifying the first and second test procedures, the virtual API control unit further outputting the resulting test procedures to the API execution unit in accordance with progress of the execution of the test procedures in the API execution unit, the API execution unit includes:

a first API execution unit for executing an API execution procedure described in the first test procedure; and a second API execution unit for executing an API execution procedure described in the second test procedure, the API execution completion standby setting unit notifies the first API execution unit and the second API execution unit of completion of the API execution, the command execution device determines which of the first and second test procedures is currently in execution from the command based on the identifier and outputs a result of the determination to the log output device, and the log output device outputs the execution result log including a log indicating which of the first and second test procedures is currently in execution based on the determination result.

The API verification system thus technically characterized can execute a plurality of test procedures at a time, and also enables the test procedures to be executed on a plurality of targets.

Effect of the Invention

Since the API verification system according to the present invention can control the software mounted on the user system using the test script by each API, the system status during the test is acquired through the API call, and the relevant software is then controlled depending on the acquired system status. According to the technical advantage, the same test conditions can always be provided. As a result, subordinate software, such as device driver, can be tested on the boundary face of the API.

EXEMPLARY MODES FOR CARRYING OUT THE INVENTION

Hereinafter, exemplary embodiments of an API verification system according to the present invention are described referring to the drawings. In the exemplary embodiments described below, any structural elements shown with the same reference symbols carry out similar operations, and description of such structural elements may be omitted.

Exemplary Embodiment 1

Figure 1:
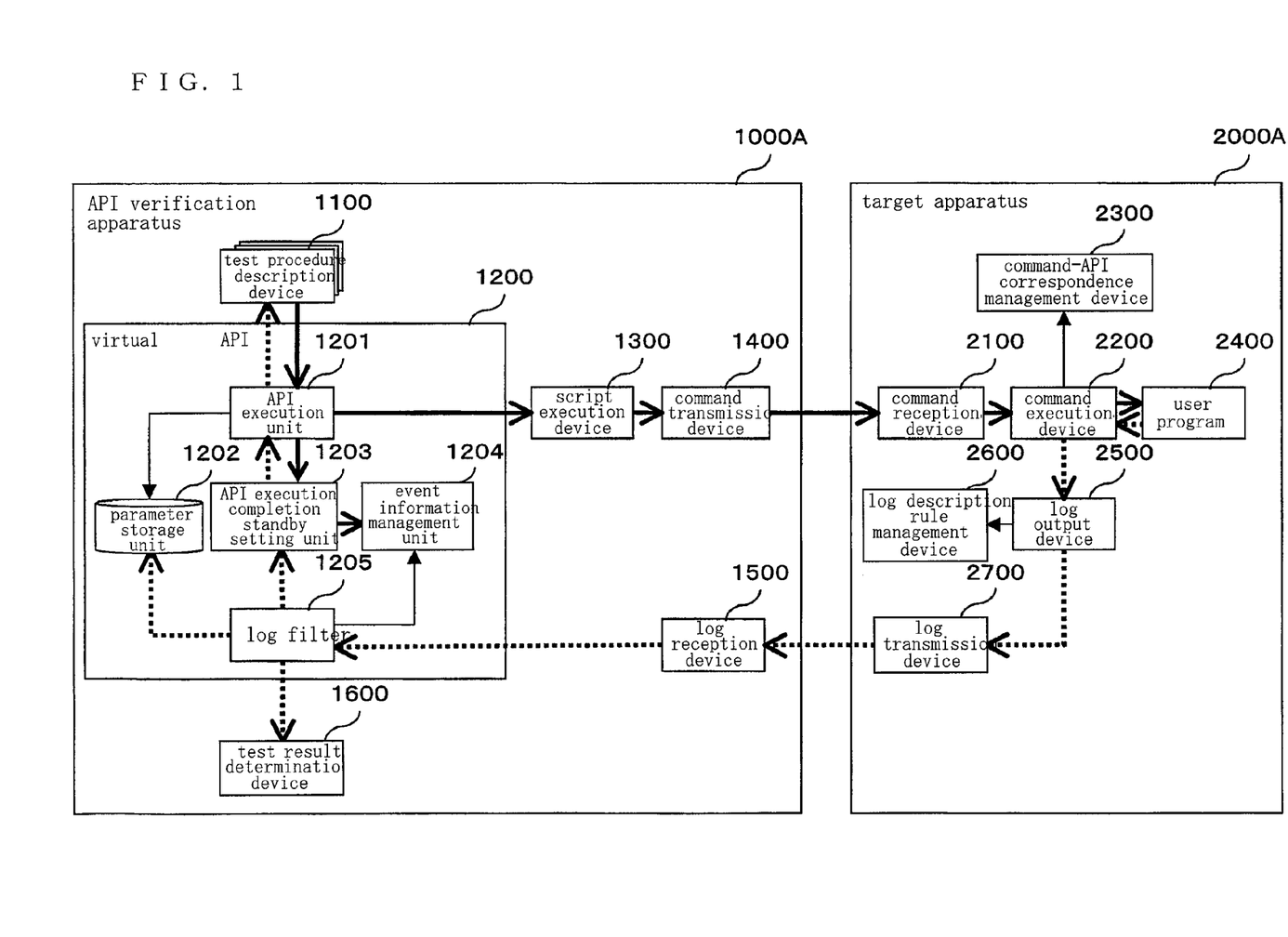
FIG. 1 is a block diagram illustrating an overall structure of a verification system according to an exemplary embodiment 1 of the present invention.

FIG. 1 is a block diagram illustrating a verification system according to an exemplary embodiment 1 of the present invention. The verification system according to the present exemplary embodiment has an API verification apparatus 1000A and a target apparatus 2000A operated on a host PC.

The API verification apparatus 1000A is equipped with a test procedure description device 1100, a virtual API device 1200, a script execution device 1300, a command transmission device 1400, and a log reception device 1500. The virtual API device 1200 has an API execution unit 1201, a parameter storage unit 1202, an API execution completion standby setting unit 1203, an event information management unit 1204, a log filter 1205, and a test result determination device 1600. The target apparatus 2000A is equipped with a command reception device 2100, a command execution device 2200, a command-API correspondence management device 2300, a user program 2400, a log output device 2500, a log description rule management device 2600, and a log transmission device 2700.

Hereinafter are described an actual operation flow in verification and operations of the structural elements. The operations to be verified are; command transmission by the API verification apparatus 1000A, log transmission by the target apparatus 2000A, and log reception by the API verification apparatus 1000A.

[Command Transmission by API Verification Apparatus 1000A]

A test execution procedure is described in the test procedure description device 1100. The test execution procedure recites therein procedures for value assignment to argument to be given to API and API call order. In the description given below, the test execution procedure divided by each API execution unit is called API execution procedure. When the verification starts, the test procedure description device 1100 outputs the test procedure to the API execution unit 1201. The API execution unit 1201 which received the test procedure registers information of variables used to set argument and return values in the parameter storage unit 1202, and further sets such an API execution registration that standby is sustained until the execution of API is completed in the API execution completion standby setting unit 1203. Then, the API execution unit 1201 outputs the API execution procedure to the script execution device 1300.

Figure 2:
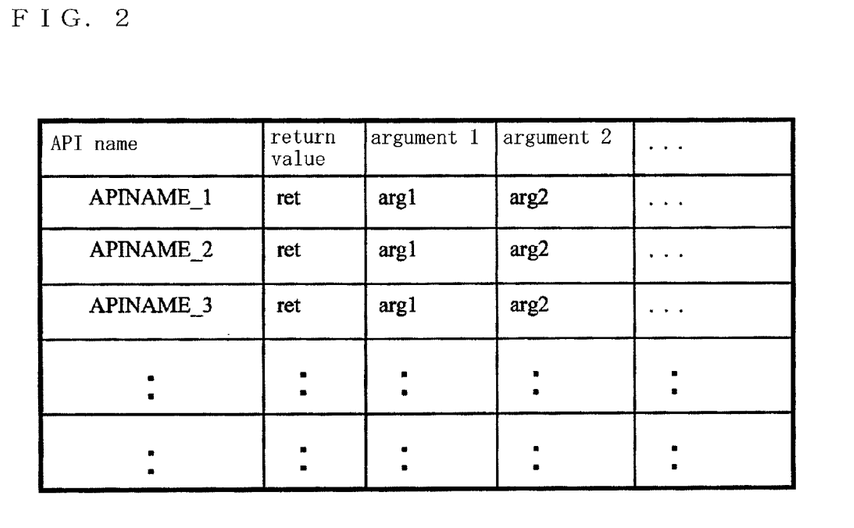
FIG. 2 is an illustration of a data structure registered in a parameter storage unit according to the exemplary embodiment 1.

This paragraph describes parameter detailed contents registered and stored in the parameter storage unit 1202. The parameter detailed contents is information of variables used to set argument and return values. FIG. 2 is an illustration of the parameter detailed contents registered and stored in the parameter storage unit 1202. The parameter detailed contents stored in the parameter storage unit 1202 are API names, and argument and return values given to the API in a mutually corresponding manner. Therefore, the argument and return values can be known from the relevant registered API name in the parameter detailed contents. Only a parameter value inputted to the API to call the API is set in the argument and return values. After the API call is done, an output parameter is set in the argument and return values. The output parameter is set by the log filter 1205.

The API execution completion standby setting unit 1203 registers an API-completed event in the event information management unit 1204. More specifically, the API execution completion standby setting unit 1203 registers "WAITING information" in the event information management unit 1204 as the API-completed event. The event information management unit 1204 remains "WAITING" based on the "WAITING information" until the log filter 1205 is notified of the registered information (API and parameter detailed contents) as an event. Examples of the "WAITING" are infinite loop or polling which is periodical confirmation of events, however, the "WAITING" is not necessarily limited to these examples.

Figure 3:
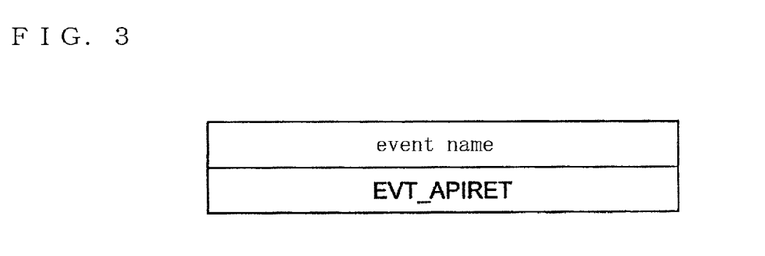
FIG. 3 is an illustration of an event information according to the exemplary embodiment 1.

The event information management unit 1204 holds an event information in which the API-completed event and the API are recited with a correspondence relationship therebetween. FIG. 3 illustrates an example of the event information kept by the event information management unit 1204. In the example illustrated in FIG. 3, a string of characters represents an event name. The virtual API device 1200 determines whether the operation returns from the API call by determining whether the event information kept by the event information management unit 1204 is detected. The parameter storage unit 1202 holds the parameter detailed contents such as argument and return values registered by the API execution unit 1201.

Figure 4:
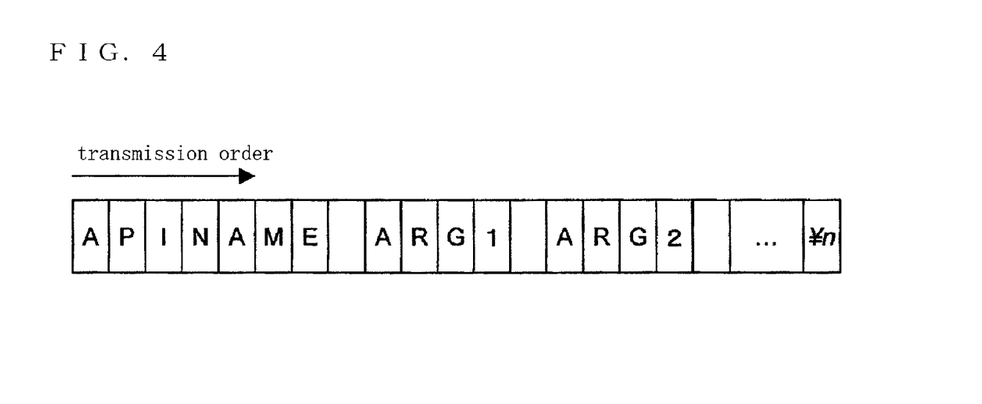
FIG. 4 is an illustration of a command structure according to the exemplary embodiment 1.

The script execution device 1300 interprets the API execution procedure transmitted from the API execution unit 1201 to convert the API execution procedure into a command structure illustrated in FIG. 4 (hereinafter, simply called command). The script execution device 1300 outputs the command (API execution procedure) to the command transmission device 1400. The command transmission device 1400 transmits the command received from the script execution device 1300 to the target apparatus 2000A following a transmission order.

The command transmitted by the command transmission device 1400 is described below. As illustrated in FIG. 4, the command is expressed by a string of characters in which the API expressed by a string of characters, "APINAME", at its head, and then argument values of the API, which are arranged in a given order. The command is transmitted from the command transmission device 1400 to the target apparatus 2000A in accordance with the arrangement order.

[Command Reception/Log Transmission by Target Apparatus 2000A]

The command reception device 2100 receives the command transmitted from the API verification apparatus 1000A, and sends the received command to the command execution device 2200. The command execution device 2200 references the correspondence relationship between the command and API stored in the command-API correspondence management device 2300 to read the API relevant to the received command from the user program 2400 and executes the read API. Below is given a more detailed description.

Figure 5:
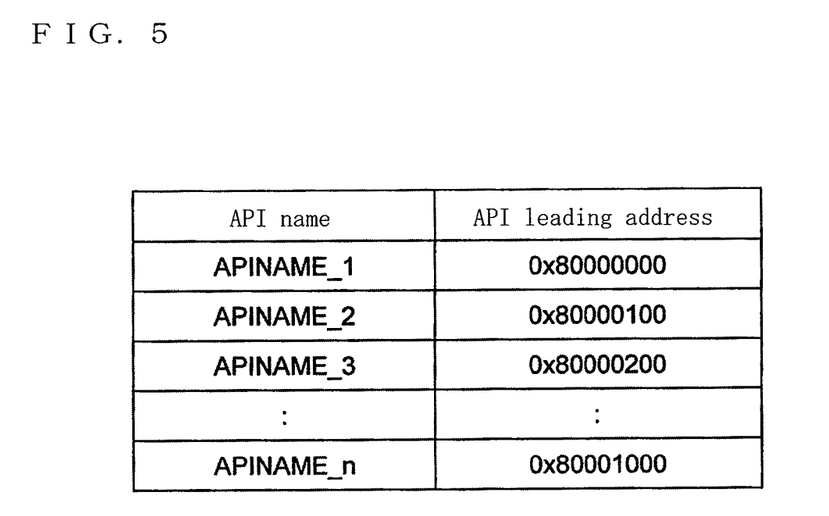
FIG. 5 is a table illustrating a command-API correspondence according to the exemplary embodiment 1.

As illustrated in FIG. 5, the command-API correspondence management device 2300 retains the API name and an address where the API is located in a memory of the user program 2400 (hereinafter, simply called memory) so that they can be referenced with a correspondence relationship therebetween. The command execution device 2200 checks the command-API correspondence management device 2300 for the API name in the command (in the illustrated example, a string of characters, "APINAME#X" (X: serial number)) to identify a leading address where the API is located on the memory (hereinafter, called API leading address). The command-API correspondence management device 2300 executes the API at the identified API leading address. The command execution device 2200 acquires a result of the API execution (argument and return values) from the user program 2400, and gives the acquired result to the log output device 2500. The log output device 2500 creates a log indicating the received API execution result (hereinafter, called API execution result log) based on a management information provided in the log description rule management device 2600 (hereinafter, called log description rule). The log output device 2500 then outputs the created API execution result log to the log transmission device 2700.

Figure 6:
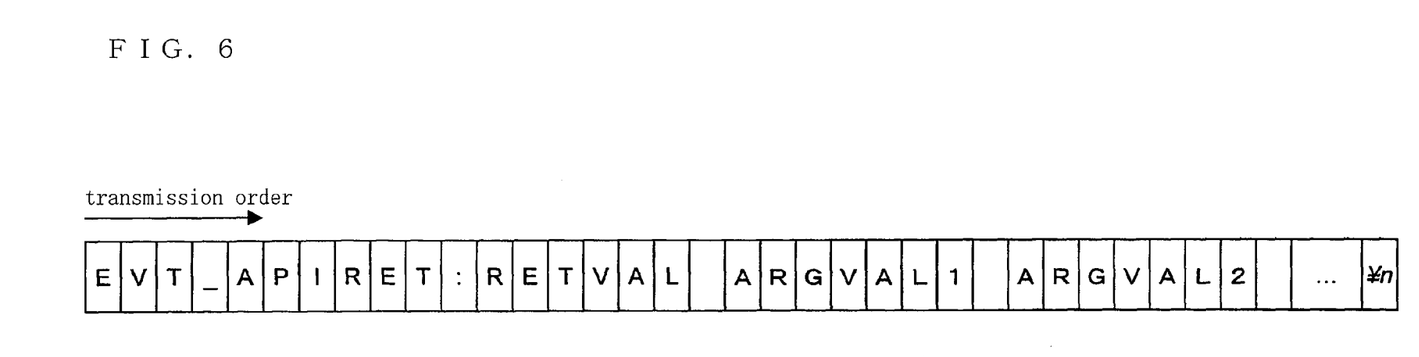
FIG. 6 is an illustration of a log description rule according to the exemplary embodiment 1.

Referring to FIG. 6 is described a structure of the log description rule managed by the log description rule management device 2600. FIG. 6 illustrates an example of the log description rule when the API on the user program 2400 is called. The given example has a string of characters "EVT_A-PIRET" at its head, followed by "RETVAL", and then "ARGVAL1" and "ARGVAL2". These portions are arranged before or after one another based on a positional relationship which follows the order of data transmission.

"EVT_APIRET:" indicates the log description rule to call the API. The return value which is returned when the API is called is appended to "RETVAL" as a log. A log of parameters outputted as the argument values of the API are appended to the portions of "ARGVAL1" and "ARGVAL2".

Figure 9:
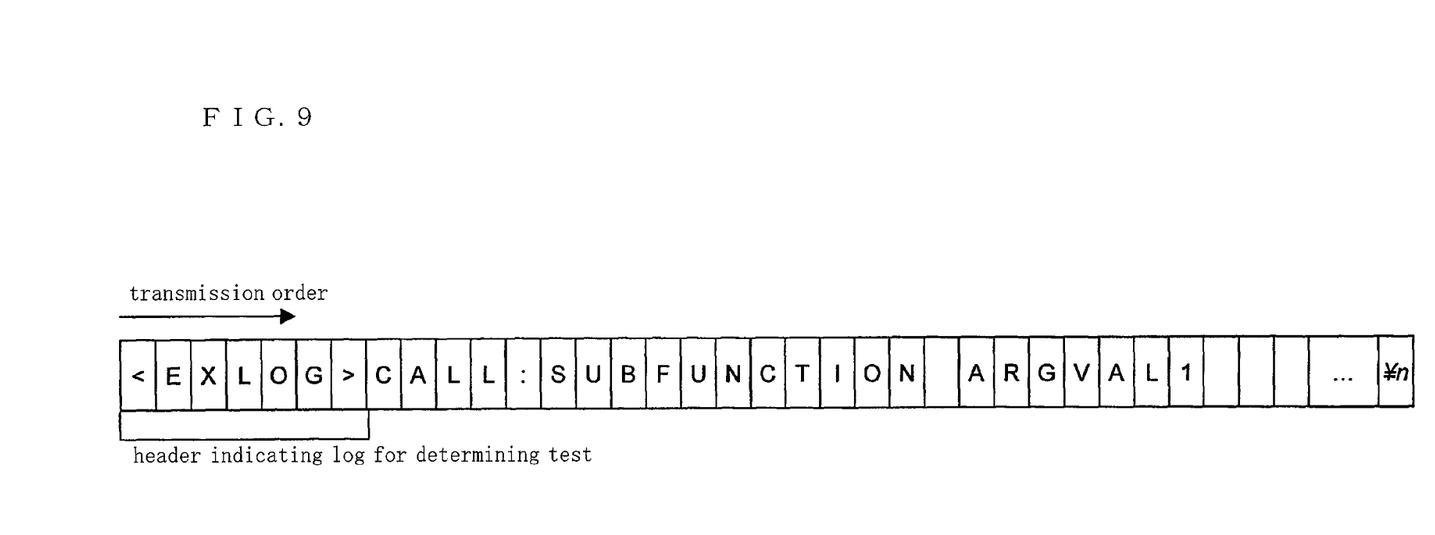
FIG. 9 is an illustration of an execution log description rule according to the exemplary embodiment 1.

The description returns to the output operation by the log output device 2500. The log output device 2500 outputs a log for determining the test result (hereinafter, called test result determination log) to the log transmission device 2700 along with the API execution result log described in the log description rule. The test result determination log is a log indicating, for example, information of the argument and return values given to the API and processing route in the API. A header indicating that the relevant log is the test result determination log is appended to the top of the test result determination log. An example of the header is "<EXLOG>" illustrated in FIG. 9. Hereinafter, the API execution result log and the test result determination log are collectively called an execution result log. The log transmission device 2700 transmits the execution result log to the log reception device 1500 of the API verification apparatus 1000A.

[Log Reception by API Verification Apparatus 1000A]

The log reception device 1500 outputs the execution result log received from the target apparatus 2000A to the log filter 1205. The log filter 1205 which received the execution result log acquires the "WAITING information" from the event information management unit 1204. As describe earlier, the "WAITING information" is information relating to the API (event) for which the API execution completion standby setting unit 1203 is currently WAITING. The log filter 1205 analyzes the execution result log based on the "WAITING information" to determine whether the execution result log includes the API execution result which is the current target of "WAITING". Having determined that the API execution result which is currently the target of "WAITING" is included therein, the log filter 1205 determines that the API execution which is currently the target of "WAITING" is completed and sends a notice of the completion to the API execution completion standby setting unit 1203. The API execution completion standby setting unit 1203 releases the WAITING for the execution-completed API based on the received notice (notifying the completion of API execution). Further, the log filer 1205 extracts the API execution result log of the already processed API from the execution result log. As described earlier, the log includes the information of the argument and return values. The log filter 1205 collates the extracted API execution result log with the information of variables registered in the parameter storage unit 1202 to set the values (argument and return values). The log filer 1205 outputs the set values (argument and return values) of the API execution result to the API execution completion standby setting unit 1203 by way of the log filter 1205.

Moreover, the log filter 1205 extracts the test result determination log from the execution result log and outputs the extracted test result determination log to the test result determination device 1600. The test result determination device 1600 analyzes the test result determination log inputted thereto to determine whether the execution-completed API was accurately executed.

The API execution completion standby setting unit 1203 outputs the values of the API execution result log (argument and return values) to the test procedure description device 1100 by way of the API execution unit 1201 at a timing of releasing the WAITING. The test procedure description device 1100 calls the next API based on the obtained values of the API execution result log (argument and return values).

According to the exemplary embodiment described so far, the virtual API device 1200 transmits the API call command in synchronization with the target apparatus 2000A, and analyzes the execution result log outputted in a predefined format to set the argument and return values and then returns the set argument and return values to the test procedure description device 1100. As a result, the target-side API execution can be controlled on the test procedure description device 1100 by using the same interface as that of the user program provided by the virtual API device 1200. According to the technical feature of the present exemplary embodiment, the test result determination device 1600 can automatically determine the test result based on the execution result log thus outputted on the target apparatus 2000A.

Figure 7:
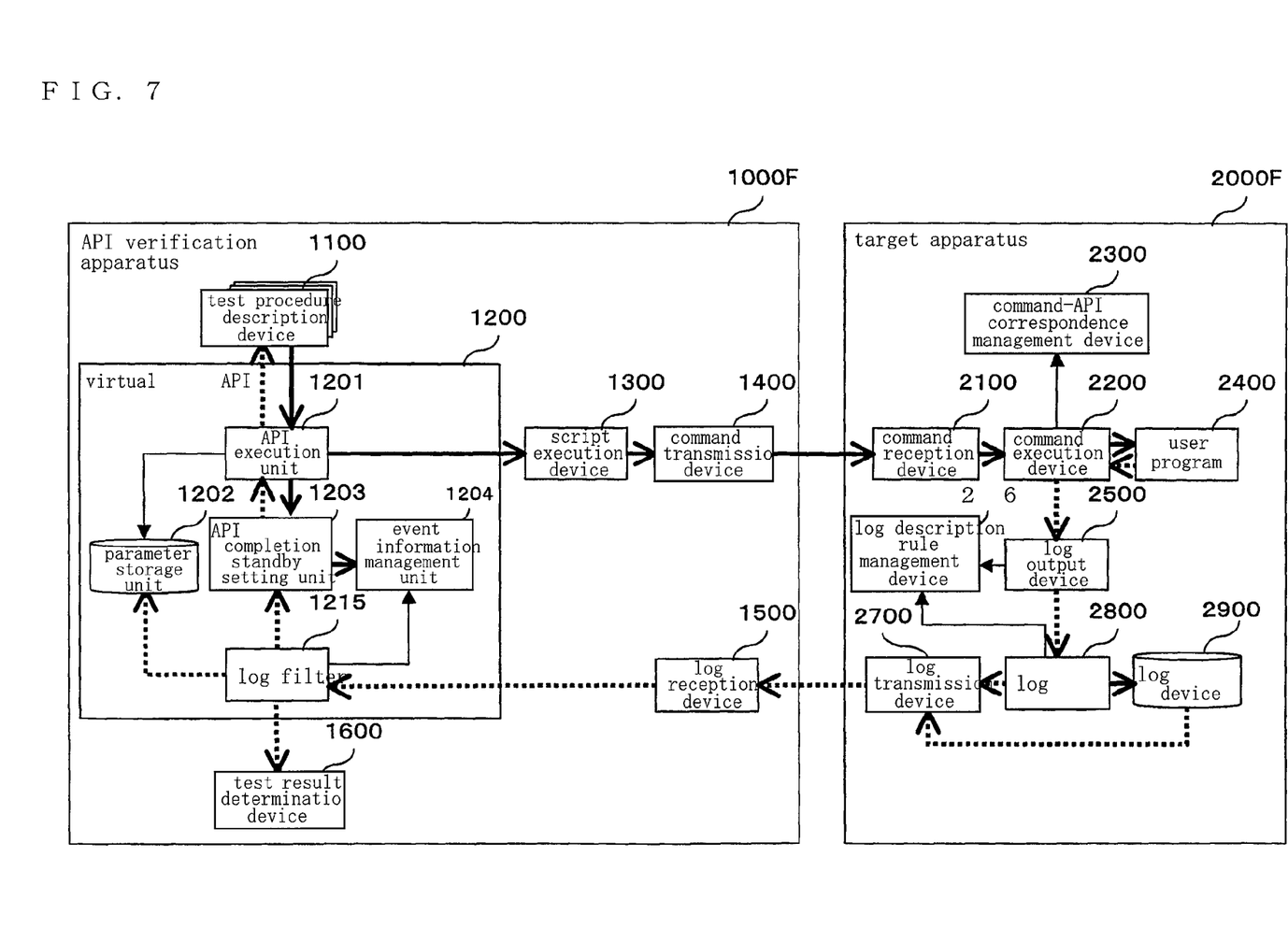
FIG. 7 is a block diagram illustrating an overall structure of the verification system according to the exemplary embodiment 1.

According to a modified mode of the present exemplary embodiment, a target apparatus 2000F is provided with a log storage device 2900 and a log filter 2800 as illustrated in FIG. 7. In the suggested structure, the test result determination log is temporarily stored in the log storage device 2900 of the target apparatus 2000F, and the test result determination log is transmitted from a log transmission device 2700 of the target apparatus 2000F to an API verification apparatus 1000F as soon as the test procedures routine is carried out. In the API verification apparatus 1000F, the received test result determination log is outputted to the test result determination device 1600 by way of the log reception device 1500 and a log filter 1215. This technical feature can avoid any delay in the API execution possibly caused by the transmission of the test result determination log.

Figure 8:
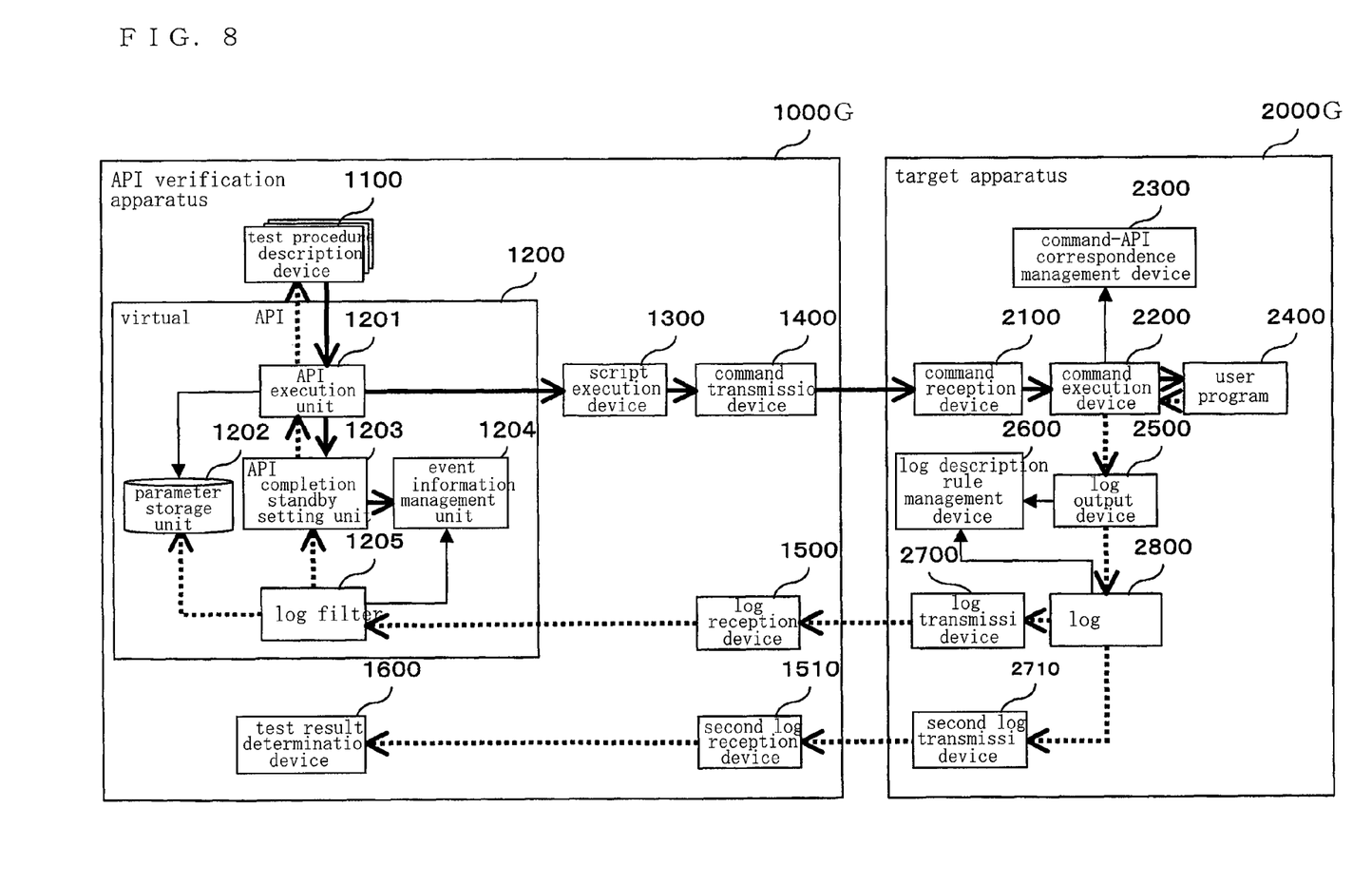
FIG. 8 is a block diagram illustrating an overall structure of the verification system according to the exemplary embodiment 1.

According to another modified mode of the present exemplary embodiment, a target apparatus 2000G is provided with a log filter 2800 and a second log transmission device 2710, and an API apparatus 1000G is provided with a second log reception device 1510 as illustrated in FIG. 8. In the suggested structure, a log filter 2800 of the target apparatus 2000G extracts the test result determination log from the API execution result log, and the log filter 2800 transmits the extracted test result determination log to the API verification apparatus 1000G by way of the second log transmission device 2710. In the API verification apparatus 1000G, the second log reception device 1510 receives the test result determination log, and then, the second log reception device 1510 directly outputs the received test result determination log to the test result determination device 1600. This technical feature can avoid any delay in the API execution possibly caused by the transmission of the test result determination log.

Exemplary Embodiment 2

An exemplary embodiment 2 of the present invention describes a system for verifying an asynchronous event. The asynchronous event according to the exemplary embodiment 2 is expressly defined as follows. The asynchronous event denotes an interrupting event generated from hardware or software on the target apparatus which is triggered by the API execution. In the case of an API mounted with an inter-memory data transfer start processing, it can be confirmed after the API is called whether the data transfer started, however, whether or not the data transfer is finished cannot be confirmed until a response is actually received from hardware and its subordinate program. The "response" is, for example, a data transfer completion notice. The response from hardware and its subordinate program is called the asynchronous event in this description.

Figure 10:
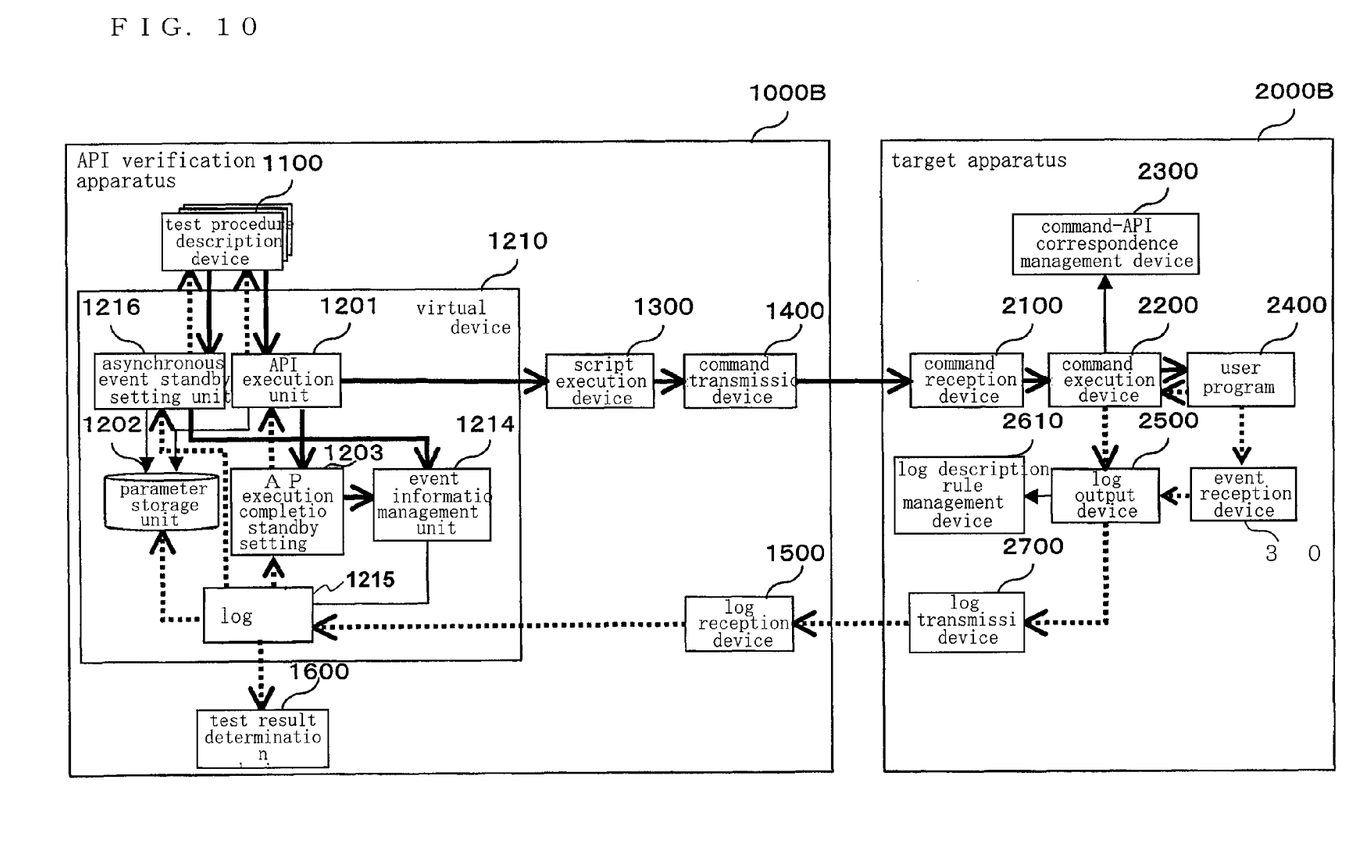
FIG. 10 is a block diagram illustrating an overall structure of a verification system according to an exemplary embodiment 2 of the present invention.

FIG. 10 is a block diagram illustrating a structure of a verification system according to the exemplary embodiment 2. Similarly to the structure illustrated in FIG. 1, the verification system illustrated in FIG. 10 has an API verification apparatus 1000B and a target apparatus 2000B operated on a host PC. The API verification apparatus 1000B is equipped with a test procedure description device 1100, a virtual API device 1210, a script execution device 1300, a command transmission device 1400, and a log reception device 1500. The virtual API device 1210 has an API execution unit 1201, a parameter storage unit 1202, an API execution completion standby setting unit 1203, an event information management unit 1214, a log filter 1215, and an asynchronous event standby setting unit 1216.

The target apparatus 2000B has a command reception device 2100, a command execution device 2200, a command-API correspondence management device 2300, a user program 2400, a log output device 2500, a log description rule management device 2610, a log transmission device 2700, and an event reception device 3000.

The present exemplary embodiment is different to the exemplary embodiment 1 in that:
  the API verification apparatus 1000B is provided with the asynchronous event standby setting unit 1216;
  the event information management unit 1214 has a asynchronous event management function;
  the log filter 1215 has an asynchronous event extraction function; and
  the target apparatus 2000B is provided with the event reception device 3000.

Below are described operations of the respective structural elements according to the present exemplary embodiment when WAITING of the asynchronous event is processed. The operations to be verified are; preparatory operation by the API verification apparatus 1000B, log transmission by the target apparatus 2000B, and log reception by the API verification apparatus 1000B.

[Preparatory Operation by API Verification Apparatus 1000B]

To process the WAITING of the asynchronous event, the test procedure description device 1100 outputs information of an asynchronous event WAITING process procedure to the asynchronous event standby setting unit 1216. The asynchronous event standby setting unit 1216 registers information of the event which is the target of the WAITING process in the event information management unit 1214. The asynchronous event WAITING process procedure is a sequence of processing steps carried out by the time when standby set to start by the asynchronous event standby setting unit 1216 is ended (returned).

[Log Transmission by Target Apparatus 2000B]

When the asynchronous event triggered by the API execution by the test procedure description device 1100 occurs in a system on the target apparatus 2000B after the preparatory operation by the API verification apparatus 1000B is finished, the event reception device 3000 receives a parameter transmitted in response to the occurrence of the asynchronous event from the user program 2400, and outputs the received parameter to the log output device 2500. The log output device 2500 creates an execution result log of the asynchronous event referring to a log description rule of the asynchronous event stored in the log description rule management device 2610. The log output device 2500 outputs the created execution result log of the asynchronous event to the log transmission device 2700. The log transmission device 2700 transmits the received execution result log of the asynchronous event to the log reception device 1500 of the API verification apparatus 1000B.

[Log Reception by API Verification Apparatus 1000B]

The log reception device 1500 outputs the execution result log of the asynchronous event received from the log transmission device 2700 to the log filter 1215. The log filter 1215 analyzes the received execution result log of the asynchronous event. When the asynchronous event registered in the event information management unit 1214 is detected in the execution result log thus analyzed, the log filter 1215 sets the parameter included in the asynchronous event log in the parameter storage unit 1202, and notifies the asynchronous event standby setting unit 1216 of the detection of the asynchronous event.

The asynchronous event standby setting unit 1216 notified of detection of the asynchronous event calls a variable returned from the parameter storage unit 1202 based on the asynchronous event. Then, the asynchronous event standby setting unit 1216 sets the value returned at the time of occurrence of the asynchronous event in the called variable and then returns the resulting variable to the test procedure description device 1100.

According to the present exemplary embodiment described so far, the log filter 1215 determines the asynchronous event referring to the event information management unit 1214 at the time of the WAITING process of the asynchronous event to detect whether the asynchronous event occurred in the target apparatus 2000B (execution log of the asynchronous event), and then notifies the asynchronous event standby setting unit 1216 of the occurrence of the asynchronous event. The information referenced by the log filter 1215 in the event information management unit 1214 is information of the event to be WAITING-processed which was set in the preparatory operation in advance by the API verification apparatus 1000B.

According to the present exemplary embodiment thus technically characterized, actual internal processing steps are implemented after the return value is obtained subsequent to the API execution. Then, the API accomplishes its intended object when the asynchronous event which occurs as soon as the processing steps are completed is received. Thus, the generally called asynchronous event can be verified.

Exemplary Embodiment 3

Figure 11:
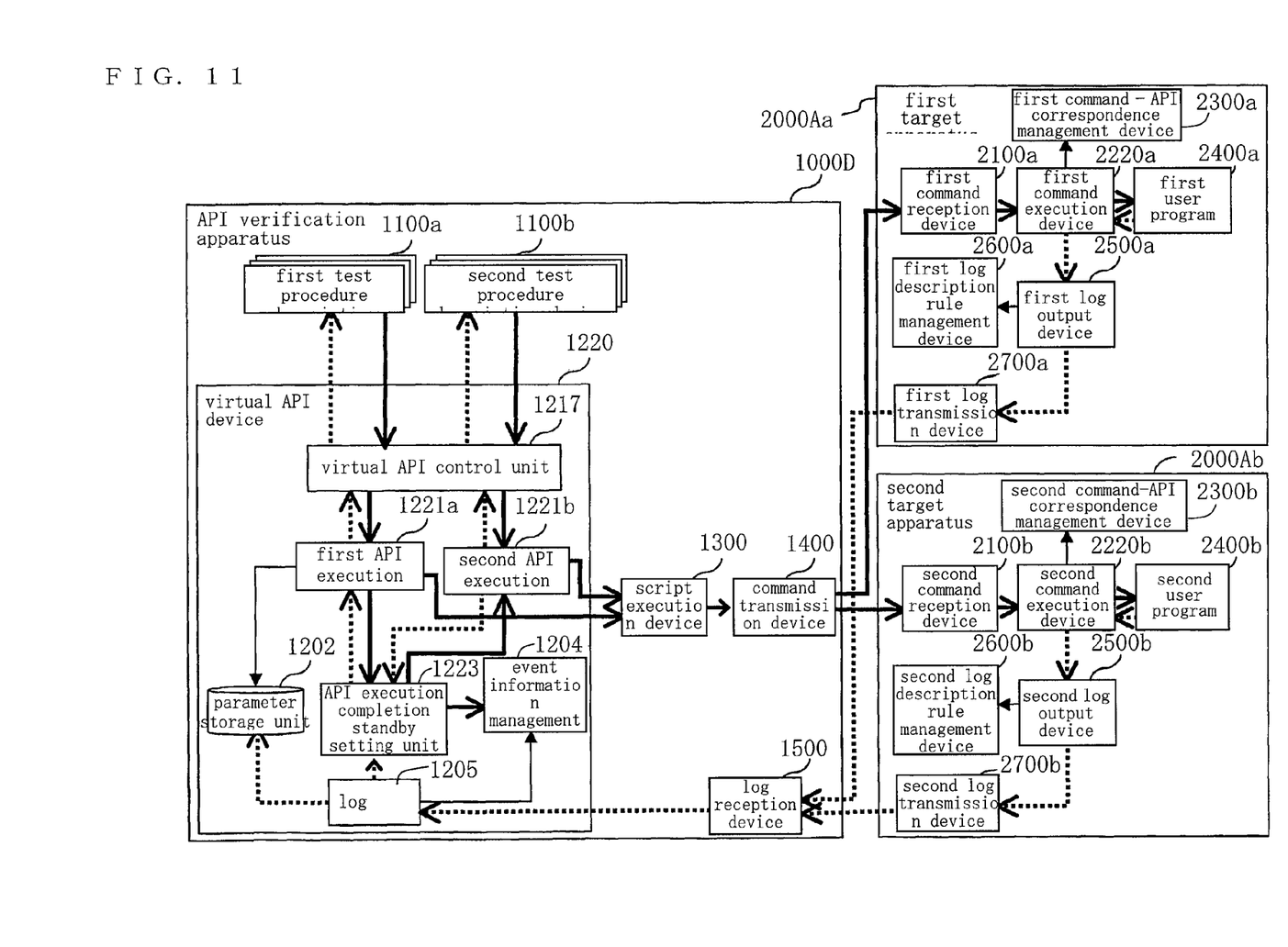
FIG. 11 is a block diagram illustrating an overall structure of a verification system according to an exemplary embodiment 3 of the present invention.

As illustrated in FIG. 11, a verification system according to an exemplary embodiment 3 of the present invention has an API verification apparatus 1000D, a first target apparatus 2000Aa, and a second target apparatus 2000Ab which are operated on a host PC. The first target apparatus 2000Aa is provided with a first command reception device 2100a, a first command execution device 2220a, a first command-API correspondence management device 2300a, a first user program 2400a, a first log output device 2500a, a first log description rule management device 2600a, and a first log transmission device 2700a. The second target apparatus 2000Ab is provided with a second command reception device 2100b, a second command execution device 2200b, a second command-API correspondence management device 2300b, a second user program 2400b, a second log output device 2500b, a second log description rule management device 2600b, and a second log transmission device 2700b.

Thus, the first target apparatus 2000Aa and the second target apparatus 2000Ab respectively have a structure similar to that of the target apparatus 2000A. Further, similarly to the exemplary embodiment 1 (FIG. 1), the API verification apparatus 1000D is provided with test procedure description devices 1100, a virtual API device 1200, a script execution device 1300, a command transmission device 1400, and a log reception device 1500.

The present exemplary embodiment is different to the exemplary embodiment 1 (FIG. 1) in that a virtual API device 1220 is equipped with a virtual API control unit 1217, a first API execution unit 1221a, a second API execution unit 1221b, and an API execution completion standby setting unit 1223. The first API execution unit 1221a and the second API execution unit 1221b are functionally equal to each other.

Below are described operations of the respective structural elements in the verification system according to the present exemplary embodiment thus structurally characterized. The operations to be verified are; command transmission by the API verification apparatus 1000D, log transmission by the first and second target apparatuses 2000Aa and 2000Ab, and log reception by the API verification apparatus 1000D.

[Command Transmission by API Verification Apparatus 1000D]

The test execution procedure is described in a first test procedure description device 1100a and a second test procedure description device 1100b. The test procedure recites therein procedures for value assignment to argument to be given to API and API call order. When the verification starts, the first test procedure description device 1100a and the second test procedure description device 1100b respectively output the test procedures to the virtual API control unit 1217. The test execution procedure described in each of the first test procedure description device 1100a and the second test procedure description device 1100b contains identification information used for identification of tests (hereinafter, called script identification information).

The virtual API control unit 1217 outputs the API execution procedure to one of the first API execution unit 1221a and the second API execution unit 1221b. When the API execution procedure is outputted, the virtual API control unit 1217 chooses one of the first API execution unit 1221a and the second API execution unit 1221b to which the API execution procedure should be outputted. The following paragraph describes how one of the API execution units is chosen.

The virtual API control unit 1217 determines whether the API execution procedure can be outputted to one of the API execution units (for example, first API execution unit 1221a) arbitrarily chosen. This can be determined by confirming whether any other API procedure is already being implemented in the chosen API execution unit. The virtual API control unit 1217, which determined that the API execution procedure can be outputted to the chosen API execution unit, outputs the API execution procedure to the chosen API execution unit (for example, first API execution unit 1221a). The virtual API control unit 1217, which determined that the API execution procedure cannot be outputted to the chosen API execution unit, outputs the API execution procedure to the other API execution unit (for example, second API execution unit 1221b). To simplify the description below, a reference symbol 1221x is used to describe the API execution unit to which the API execution procedure is outputted.

To output the API execution procedure, the virtual API control unit 1217 appends identification information used for identification of the target apparatus which is the destination of the transmitted API execution procedure (hereinafter, called target apparatus identification information) to the API execution procedure. Examples of the target apparatus identification information are IP address and MAC address, however, the information is not necessarily limited thereto.

The API execution unit 1221x, which received the API execution procedure, outputs the received API execution procedure to the script execution device 1300. At the time, the API execution unit 1221x creates and keeps information which identifies the script currently in execution based on the script description information. The script execution device 1300 interprets the received API execution procedure to convert the API execution procedure into a command (consisting of API name and argument), and transmits the command to the command transmission device 1400. The script execution device 1300 appends the target apparatus identification information and script description information to the created command. As described earlier, the target apparatus identification information is appended to the API execution procedure by the virtual API control unit 1217.

The command transmission device 1400 transmits the command (API execution procedure) to a target apparatus 2000Ax based on the target apparatus identification information appended to the API execution procedure. The target apparatus 2000Ax is one of the first target apparatus 2000Aa and the second target apparatus 2000Ab, or both of the first target apparatus 2000Aa and the second target apparatus 2000Ab.

[Command Reception/Log Transmission by First and Second Target Apparatuses 2000Aa and 2000Ab]

The first and second target apparatuses 2000Aa and 2000Ab are exactly the same in view of their functions and operations. Therefore, the operation of the first target apparatus 2000Az is used in the description given below.

When the first command reception device 2100a receives the command, the first command reception device 2100a outputs the received command to the first command execution device 2220a. The first command execution device 2220a converts the received command into a command and API argument by checking the first command-API correspondence management device 2300a. The first command execution device 2220a executes the API on the first user program 2400a based on the command and API argument obtained by the conversion.

The first command execution device 2220a thus executes the API on the first user programs 2400a to thereby acquire information which identifies the script currently in execution (hereinafter, called script identification information), information which identifies the target currently in execution (hereinafter, called target identification information), and return value obtained by executing the API, and outputs these acquired informations to the first log output device 2500a.

The first log output device 2500a outputs the return value obtained by the API execution, script identification information, and target identification information to the first log transmission device 2700a. The return value, script identification information, and target identification information represent a log obtained as a result of the API execution which followed an instruction by the first log description rule management device 2600a (execution result log). The first log transmission device 2700a, which received the execution result log, transmits the received execution result log from the first log output device 2500a to the log reception device 1500 of the API verification apparatus 1000D.

[Log Reception by API Verification Apparatus 1000D]

The log reception device 1500 outputs the received execution result log to the log filter 1205 of the virtual API device 1220. The log filter 1205 checks the received execution result log referring to the event information management unit 1204 to determine whether there is a log indicating the API execution standby event is included in the received log. Having determined that the log indicating the API execution standby event is included in the received log, the log filter 1205 sets a return value parameter corresponding to the API execution standby event in the parameter storage unit 1202, and then notifies the API execution completion standby setting unit 1223 of the script identification information and the target identification information. The API execution completion standby setting unit 1223 outputs the received script identification information and target identification information to the first API execution unit 1221*a* and the second API execution unit 1221*b*. The first API execution unit 1221*a* and the second API execution unit 1221*b* interpret the script identification information. Having determined that the interpreted script is the script currently in execution, the first API execution unit 1221*a* and the second API execution unit 1221*b* obtain the return value parameter from the parameter storage unit 1202, and return the obtained return value parameter to the virtual API control unit 1217. The virtual API control unit 1217 which received the return value parameter nominates one of the first test procedure description device 1100*a* and the second test procedure description device 1100*b*, and returns the return value to the nominated test procedure description device. In the case where the same script is being executed on any other target, the virtual API control unit 1217 waits for completion of API execution on the other target.

According to the present exemplary embodiment described so far, a plurality of test procedures can be executed at a time. The present exemplary embodiment is further technically advantageous when more than one test procedure is executed in that the virtual API control unit 1217 nominates the destination of the transmitted command so that a plurality of target apparatuses can be controlled on per-API basis at a time.

INDUSTRIAL APPLICABILITY

As described thus far, the API verification apparatus according to the present invention is effectively able to control the software mounted on the user system on per-API basis through the test script. The API verification apparatus thus technically advantageous is useful as an API verification system where an API verification apparatus and a target-side system are combined.

DESCRIPTION OF REFERENCE SYMBOLS

1000A API verification apparatus
2000A target apparatus
2000Aa first target apparatus
2000Ab second target apparatus
1100 test procedure description device
1100*a* first test procedure description device
1100*b* second test procedure description device
1200 virtual API device
1201 API execution unit
1201*a* first API execution unit
1201*b* second API execution unit
1202 parameter storage unit
1203 API execution completion standby setting unit
1204 event information management unit
1205 log filter
1217 virtual API control unit
1221*a* first API execution unit
1221*b* second API execution unit
1300 script execution device
1400 command transmission device
1500 log reception device
1510 second log reception device
1600 test result determination device
2100 command reception device
2100*a* first command reception device
2100*b* second command reception device
2200 command execution device
2200*a* first command execution device
2200*b* second command execution device
2300 command-API correspondence management device
2300*a* first command-API correspondence management device
2300*b* second command-API correspondence management device
2400 user program
2400*a* first user program
2400*b* second user program
2500 log output device
2500*a* first log output device
2500*b* second log output device
2600 log description rule management device
2600*a* first log description rule management device
2600*b* second log description rule management device
2610 log description rule management device
2700 log transmission device
2700*a* first log transmission device
2700*b* second log transmission device
2710 second log transmission device
2800 log filter
2900 log storage device

What is claimed is:

1. An API verification apparatus including a host PC connected to a target apparatus capable of executing API (Application Program Interface) to allow communication therebetween, comprising:
a test procedure description device in which a test procedure of the API is described;
a virtual API device for supplying the API to be executed by the target apparatus to the test procedure description device, and retrieving the supplied test procedure from the test procedure description device to issue a command to call the API pursuant to the retrieved test procedure;
a script execution device for performing script interpret of the command;
a command transmission device for transmitting the command for which the script interpret is done by the script execution device to the target apparatus; and
a log reception device for receiving an execution result log of the API from target apparatus which executes the API based on the command, wherein
the virtual API device acquires a return value obtained by executing the API from the execution result log received by the log reception device.

2. The API verification apparatus as claimed in claim 1, wherein
the virtual API device has a type of interface similar to the API executed on the target apparatus, the virtual API device comprising:
an API execution unit for outputting a trigger which makes the API be executed on the target apparatus;
a parameter storage unit for storing therein a parameter to be supplied to the API;
an API execution completion standby setting unit for detecting a timing of completion of the API execution by the target apparatus;
an event information management unit for managing an execution-completed event in the API executed on the target apparatus; and a log filter for extracting an information indicating the return value, an information indicating completion of the API execution, and a log relating to an information of the event from the execution result log.

3. An API verification system, comprising the API verification apparatus claimed in claim 2 and the target apparatus, wherein the target apparatus comprises:

a command reception device for receiving the command transmitted by the API verification apparatus;

a command-API correspondence management device for storing therein the command and the API with a correspondence relationship therebetween;

a command execution device for identifying the API relevant to the command received by the command reception device using the command-API correspondence management unit device and executing the identified API;

a user program mounted with a function provided by the API;

a log output device for creating the execution result log including the return value obtained when the command execution device executes the API and a return argument value;

a log description rule management device for defining a method for outputting the execution result log; and a log transmission device for transmitting the execution result log to the API verification apparatus based on the output method defined by the log description rule management device.

4. The API verification system as claimed in claim 3, wherein the target apparatus further comprises an event reception device for receiving an asynchronous event which occurs by a discretionary timing after the API execution, the log description rule management device defines a method for outputting a log relating to the asynchronous event, the event reception device notifies the log output device of the reception of the asynchronous event, the log output device creates an execution result log including a log description rule relating to the asynchronous event read from the log description rule management device to verify the asynchronous event, the virtual API device further comprises an asynchronous event standby setting unit for detecting a timing of the occurrence of the asynchronous event in the target apparatus, the event information management unit further manages an information of the asynchronous event, and the log filter extracts a log relating to the asynchronous event from the execution result log based on the information of the asynchronous event managed by the event information management unit.

5. The API verification system as claimed in claim 3, wherein the test procedure description device includes:

a first test procedure description device in which a first test procedure is described; and a second test procedure description device in which a second test procedure is described, the virtual API device further comprises a virtual API control unit for imparting identifiers respectively to the first test procedure described in and read from the first test procedure description device and the second test procedure described in and read from the second test procedure description device, the identifiers separately identifying the first and second test procedures, the virtual API control unit further outputting the resulting test procedures to the API execution unit in accordance with progress of the execution of the test procedures in the API execution unit, the API execution unit includes:

a first API execution unit for executing an API execution procedure described in the first test procedure; and a second API execution unit for executing an API execution procedure described in the second test procedure, the API execution completion standby setting unit notifies the first API execution unit and the second API execution unit of completion of the API execution, the command execution device determines which of the first and second test procedures is currently in execution from the command based on the identifier and outputs a result of the determination to the log output device, and the log output device outputs the execution result log including a log indicating which of the first and second test procedures is currently in execution based on the determination result.

6. The API verification system as claimed in claim 3, wherein the target apparatus includes:

a first target apparatus; and a second target apparatus, an information which nominates the target apparatus which executes the test procedure is further described in the test procedure described in the test procedure description device, the API execution unit includes:

a first API execution unit; and a second API execution unit, the virtual API device further comprises a virtual API control unit for outputting a command in which an identification information of the target apparatus nominated in the test procedure is associated with the API execution unit to the API execution unit, and the API execution completion standby setting unit notifies the first API execution unit and the second API execution unit of the execution result log extracted by the log filter.

7. The API verification system as claimed in claim 3, wherein the log filter further extracts a log for determining the test result of the API from the execution result log, and the API verification apparatus further comprises a test result determination device for determining whether the API is accurately executed based on the log for determining the test result.

8. The API verification system as claimed in claim 7, wherein the target apparatus further comprises:

a log description rule management device in which a description rule of the log for determining the test result is described;

a log filter for discriminating the log for determining the test result from the execution result log; and a log storage device for storing therein the log for determining the test result discriminated by the log filter, and the log transmission device reads the log for determining the test result from the log storage device and transmits the read log to the API verification apparatus after the API execution is completed.

9. The API verification system as claimed in claim 7, wherein the target apparatus further comprises:

a log filter for discriminating the log for determining the test result from the execution result log; and a second log transmission device for transmitting the log for determining the test result discriminated by the log filter to the API verification apparatus, and the API verification apparatus further comprises a second log reception device for receiving the log for determining the test result transmitted from the second log transmission device and directly outputs the received log to the test result determination device.

* * * * *